US008611829B2

(12) United States Patent
Alberth et al.

(10) Patent No.: US 8,611,829 B2
(45) Date of Patent: Dec. 17, 2013

(54) TUNABLE FILTER FEEDBACK TO CONTROL ANTENNA SWITCH DIVERSITY

(75) Inventors: William P. Alberth, Prairie Grove, IL (US); Amin W. Klomsdorf, Chicago, IL (US); Timothy D. Forrester, San Diego, CA (US); Robert S. Ballam, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 123 days.

(21) Appl. No.: 13/205,658

(22) Filed: Aug. 9, 2011

(65) Prior Publication Data

US 2013/0040581 A1 Feb. 14, 2013

(51) Int. Cl.
*H04B 7/00* (2006.01)

(52) U.S. Cl.
USPC ............... 455/70; 455/69; 455/77; 455/90.3; 455/115.1; 455/193.1

(58) Field of Classification Search
USPC ............... 455/69, 70, 77, 90.3, 115.1, 193.1, 455/191.1, 525
See application file for complete search history.

(56) References Cited

U.S. PATENT DOCUMENTS

| | | | |
|---|---|---|---|
| 5,313,660 A * | 5/1994 | Lindenmeier et al. | 455/135 |
| 7,433,647 B2 * | 10/2008 | LeMense et al. | 455/41.1 |
| 7,542,750 B2 * | 6/2009 | Zahm | 455/277.2 |
| 7,869,537 B2 | 1/2011 | Catreux et al. | |
| 7,869,783 B2 * | 1/2011 | Morton et al. | 455/272 |
| 8,073,515 B2 * | 12/2011 | Rofougaran | 455/575.7 |
| 2004/0116076 A1 * | 6/2004 | Kuramochi | 455/73 |
| 2004/0192239 A1 * | 9/2004 | Nakao et al. | 455/136 |
| 2006/0290582 A1 * | 12/2006 | Lee | 343/745 |
| 2008/0119150 A1 * | 5/2008 | Su | 455/193.1 |
| 2008/0227414 A1 * | 9/2008 | Karmi et al. | 455/101 |
| 2008/0311858 A1 | 12/2008 | Cheng et al. | |
| 2010/0041348 A1 * | 2/2010 | Wilcox et al. | 455/77 |
| 2011/0237207 A1 * | 9/2011 | Bauder | 455/78 |
| 2011/0250926 A1 * | 10/2011 | Wietfeldt et al. | 455/525 |
| 2012/0184225 A1 * | 7/2012 | Rofougaran et al. | 455/77 |
| 2012/0258675 A1 * | 10/2012 | Itkin | 455/115.1 |
| 2013/0005277 A1 * | 1/2013 | Klomsdorf et al. | 455/77 |
| 2013/0040581 A1 * | 2/2013 | Alberth et al. | 455/70 |
| 2013/0052967 A1 * | 2/2013 | Black et al. | 455/77 |
| 2013/0078932 A1 * | 3/2013 | Asrani et al. | 455/90.3 |
| 2013/0137381 A1 * | 5/2013 | Vassiliou et al. | 455/67.15 |

* cited by examiner

*Primary Examiner* — Temesgh Ghebretinsae
*Assistant Examiner* — Md Talukder

(57) ABSTRACT

A method, antenna switching integrated circuit (IC), and communications device that connect a transmitter to a selected antenna to propagate at least one transmission signal to the selected one of at least two antennas, based on feedback information associated with one or more antennas. An antenna tuning and switching (ATS) controller receives feedback information about a current status of an antenna tuner, wherein the current status of the antenna tuner is either locked or unlocked. In response to the current status of the antenna tuner being in a locked state, the ATS controller triggers an antenna selection switch to connect the antenna (that is associated with the antenna tuner) to the transmitter in order to propagate the transmission signal(s) from the transmitter to the antenna. If the antenna tuner is in an unlocked state, the ATS controller selects a different antenna that is not associated with an antenna tuner.

17 Claims, 10 Drawing Sheets

TUNABLE FILTER FEEDBACK TO CONTROL ANTENNA SWITCH DIVERSITY

BACKGROUND

1. Technical Field

The present invention relates in general to wireless communications devices and in particular to antenna tuning and switching in wireless communications devices.

2. Description of the Related Art

As the number of mode combinations, features and functions in wireless communications devices increase, providing high quality communications with these devices becomes increasingly difficult. In addition, today's wireless communications devices are integrated with many applications including gaming applications and other electronic functionality including, for example, the use of a camera. While these applications and electronic functions are being used, ensuring that communications signals have a clear, unobstructed path to and from the antenna presents a unique challenge. The communications challenges further increase as a result of the wide range of transmission requirements associated with the various communications modes that the device is expected to support.

Traditional approaches to this challenge involve the use of multiple antennas with spatial-time signal processing. However, as handset designers continue to shrink their products for the user's convenience, the space available for radiating structures is becoming increasingly limited.

BRIEF DESCRIPTION OF THE DRAWINGS

The described embodiments are to be read in conjunction with the accompanying drawings, wherein.

DETAILED DESCRIPTION

Figure 1A:
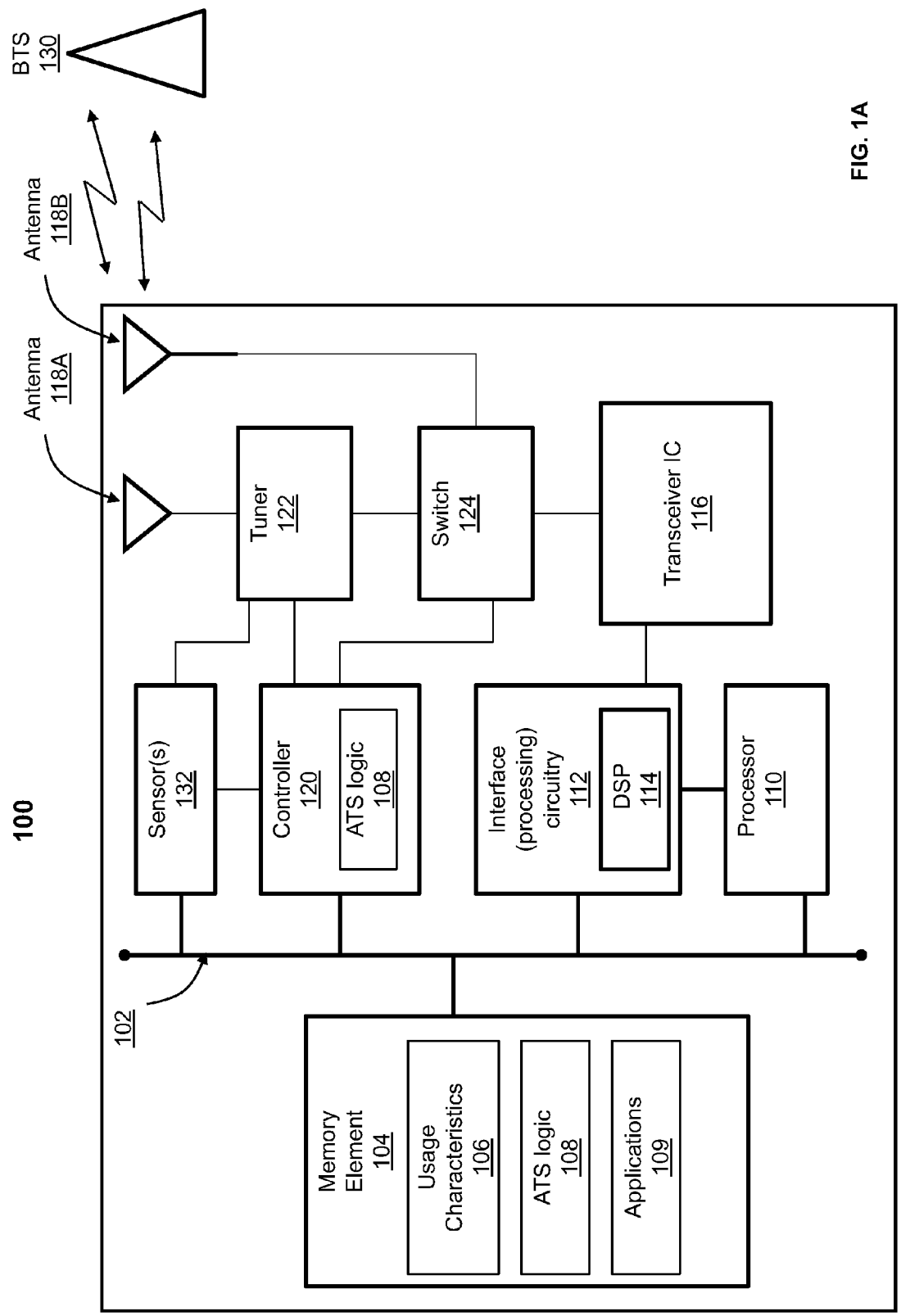
FIG. 1A illustrates an example block diagram representation of a wireless communications device, within which features of the described embodiments are incorporated, according to one embodiment.

The illustrative embodiments provide a method, antenna switching integrated circuit (IC), and communications device that connect a transmitter to a selected antenna from among at least two antennas to propagate a corresponding transmission signal to the selected antenna, based on feedback information associated with one or more of the antennas. An antenna tuning and switching (ATS) controller receives feedback information about a current status of an antenna tuner, where the current status of the antenna tuner is either locked or unlocked. In response to the current status of the antenna tuner being in a locked state, the ATS controller triggers an antenna selection switch to connect the antenna (that is associated with the antenna tuner) to the transmitter in order to propagate the transmission signal(s) from the transmitter to the antenna.

In one embodiment, if the antenna tuner is in an unlocked state, the ATS controller selects a different antenna that is not associated with the antenna tuner. However, in another embodiment, the ATS controller selects an antenna that is at least one of: (a) pre-established as a preferred antenna; (b) a less loaded antenna; and (c) an antenna that exhibits less than a threshold level of loading.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the described embodiments. The embodiments may thus be described with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the claimed embodiments to embodiments in which different element, feature or concept names are utilized. Thus, each term utilized herein is to be given its broadest interpretation given the context in which that terms is utilized.

As further described below, implementation of the functional features of the invention described herein is provided within processing devices/structures and can involve use of a combination of hardware, firmware, as well as several software-level constructs (e.g., program code) that execute to provide a specific utility for the device. The presented figures illustrate both hardware components and software/logic components within example wireless communications device architecture.

With specific reference now to FIG. 1A, there is depicted a block diagram of an example dual antenna wireless communications device 100, within which certain of the functional aspects of the described embodiments may advantageously be implemented. For simplicity, wireless communications device 100 shall be referred to herein simply by the acronym WCD 100. In one embodiment, the wireless communications device is a mobile device, such as a cellular phone, smartphone or laptop, netbook or tablet computer or similar device. As such, WCD 100 can be any type of communication device with a transceiver and a variable power supply source that includes a two-way radio communication device. WCD 100 comprises processor 110 and communication interface circuitry 112 which comprises digital signal processor (DSP) 114. Processor 110 and interface circuitry 112 are connected to memory element 104 via signal bus 102. WCD 100 includes a radio frequency (RF) transceiver integrated circuit (IC) 116 that enables WCD 100 to send and receive communication signals. In at least one embodiment, the sending and receiving functions of the transceiver occurs wirelessly, and the wireless communication is facilitated by one or more antennas (e.g., antenna 118A and antenna 118B) which work in conjunction with the transceiver IC 116. The number of antennas can vary from device to device, ranging from a single antenna to two or more antennas, and the presentation within WCD 100 of two antennas is merely for illustration. WCD 100 is able to wirelessly communicate with, for example, base transceiver system (BTS) 130 (or simply basestation) via antenna 118A/118B. WCD 100 also comprises controller 120, switch 124 and antenna tuner 122 which provide specific functionality that is described in greater detail below. Additionally, WCD 100 includes sensor(s) 132 that provides usages characteristics to controller 120, which characteristics controller 120 evaluates in selecting an antenna to which to connect transmitter/transceiver 116.

In addition to the above described hardware components of WCD 100, various features of the described embodiments can be completed and/or supported via software or firmware code or programmable logic stored within a controller, e.g., controller 120, memory 104, or other storage (not shown) and executed by one of DSP 114 and Processor 110. Thus, for example, illustrated within memory 104 are a number of software, firmware, and/or logic components or modules, including device usage characteristics data 106 and applications 109. As illustrated, Memory 104 can also comprise antenna tuning and selection (ATS) utility 108.

In the descriptions which follow, ATS utility 108 represents additional software, firmware, and/or logic components, which execute on processor 110 and/or controller 120 to provide specific functions, as described below. In the described embodiment, ATS utility 108 provides certain executable code that triggers controller 120 to perform certain antenna selection management functions. Additional detail of the functionality associated with ATS utility 108 is presented below with reference to FIG. 2A and subsequent figures.

Certain of the functions supported and/or provided by ATS utility 108 can be implemented via processing logic or code executed by a wireless device processor and/or other device hardware. Among the software code, which can be interchangeably referred to herein as program instructions and programmable logic, that can be provided by ATS utility 108, in the described embodiments, are: (a) logic for determining a current status for an antenna tuner coupled to a first antenna, which current status is one of a locked status and an unlocked status; (b) logic for selecting a first antenna to connect to a first transmitter when the current status is the locked status; (c) logic for triggering an antenna selection switch to connect a first switch input to the first antenna in order to propagate at least one transmission signal from the first transmitter to the first antenna; and (d) logic for pre-establishing a set of device conditions associated with use of a preferred antenna.

Additionally, in one or more embodiments, ATS utility 108 can further provide: (e) logic for, in response to receipt by the controller of an unlocked status of the first antenna, determining whether current device conditions match a pre-established set of device usage characteristics associated with use of a preferred antenna; (f) logic for, in response to a determination that current usage characteristics match the pre-established set of device usage characteristics, selecting an antenna from among the at least two antennas that is at least one of: (i) pre-established as the preferred antenna; (ii) a less loaded antenna; (iii) an antenna that exhibits less than a threshold level of loading; and (iv) an antenna that is not associated with an antenna tuner; and (g) logic for, in response to a determination that current usage characteristics do not match the pre-established set of device usage characteristics, selecting, without consideration of the usage characteristics, an antenna from among the at least two antennas that is at least one of: (i) a less loaded antenna; (ii) an antenna that exhibits less than a threshold level of loading; and (iii) an antenna that is not associated with an antenna tuner.

Figure 2A:
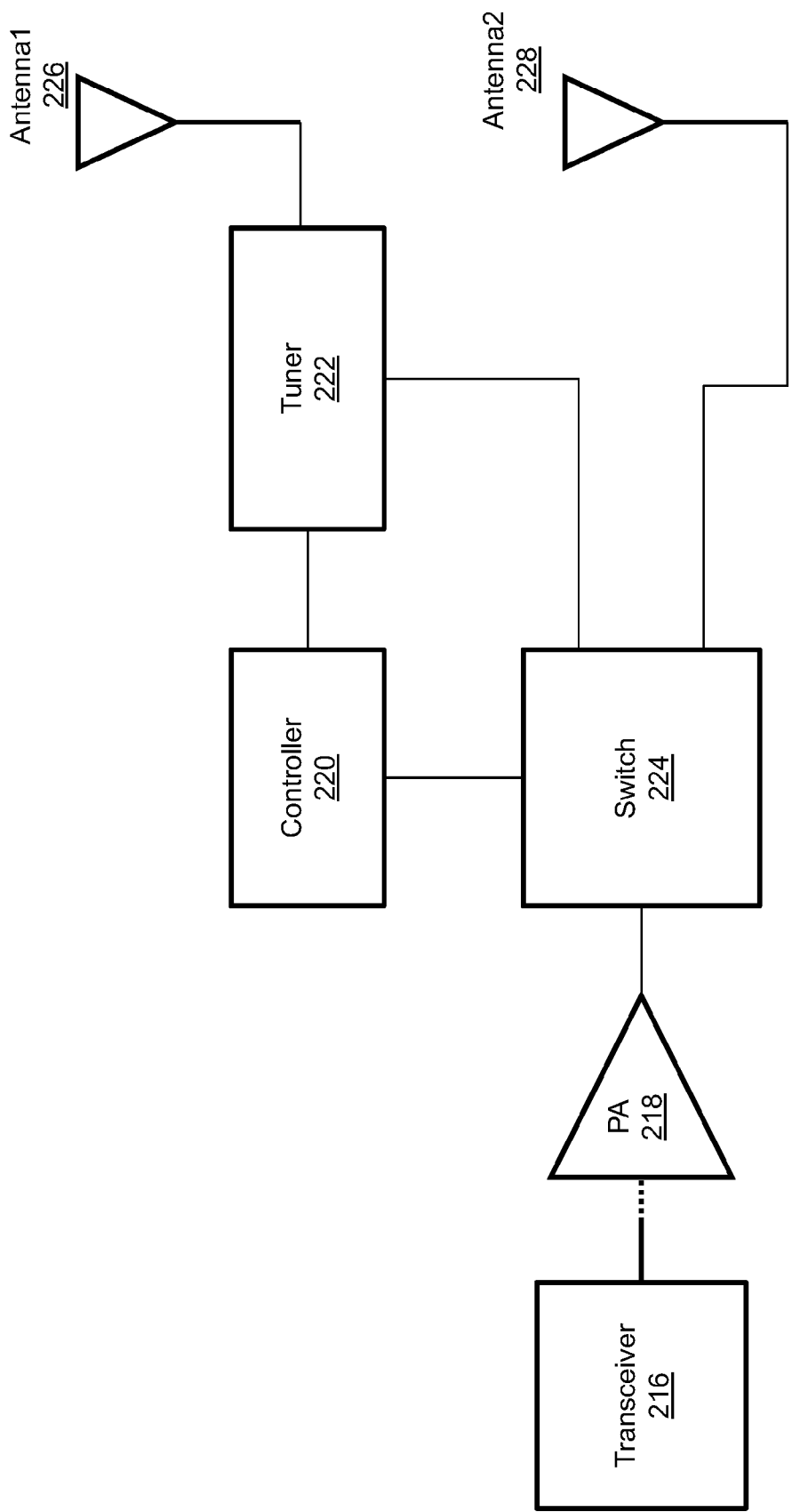
FIG. 2A illustrates a block diagram representation of radio frequency communications components (RFCC), including a controller, an antenna tuner and an antenna selection switch, in a wireless communication device (WCD), according to one embodiment.

With reference now to FIG. 2A, there is presented a block diagram representation of radio frequency communications components (RFCC), including a controller, an antenna tuner and an antenna selection switch, in a wireless communications device (WCD), according to one embodiment. RFCC 200 includes a transceiver 216 coupled to a power amplifier (PA) 218 which is further coupled to antenna selection switch 224. Antenna selection switch 224 is further coupled to controller 220. Also coupled to controller 220 is antenna tuner 222, which is further connected to a first output port of antenna selection switch 224. Additionally, antenna tuner 222 is connected to first antenna 226.

Figure 1B:
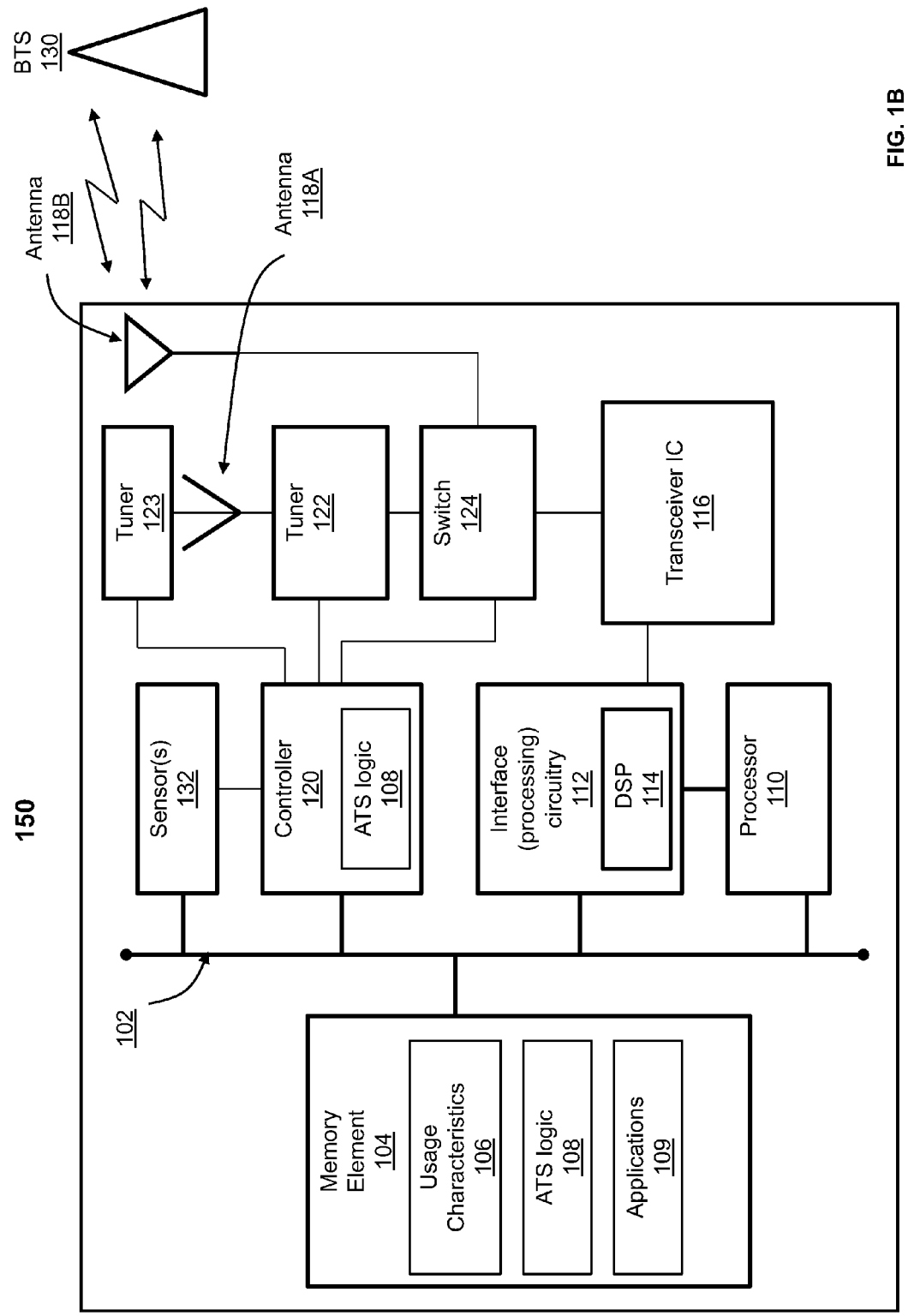
FIG. 1B illustrates another example block diagram representation of a wireless communications device, within which additional features of the described embodiments are incorporated, according to one embodiment.
Figure 2B:
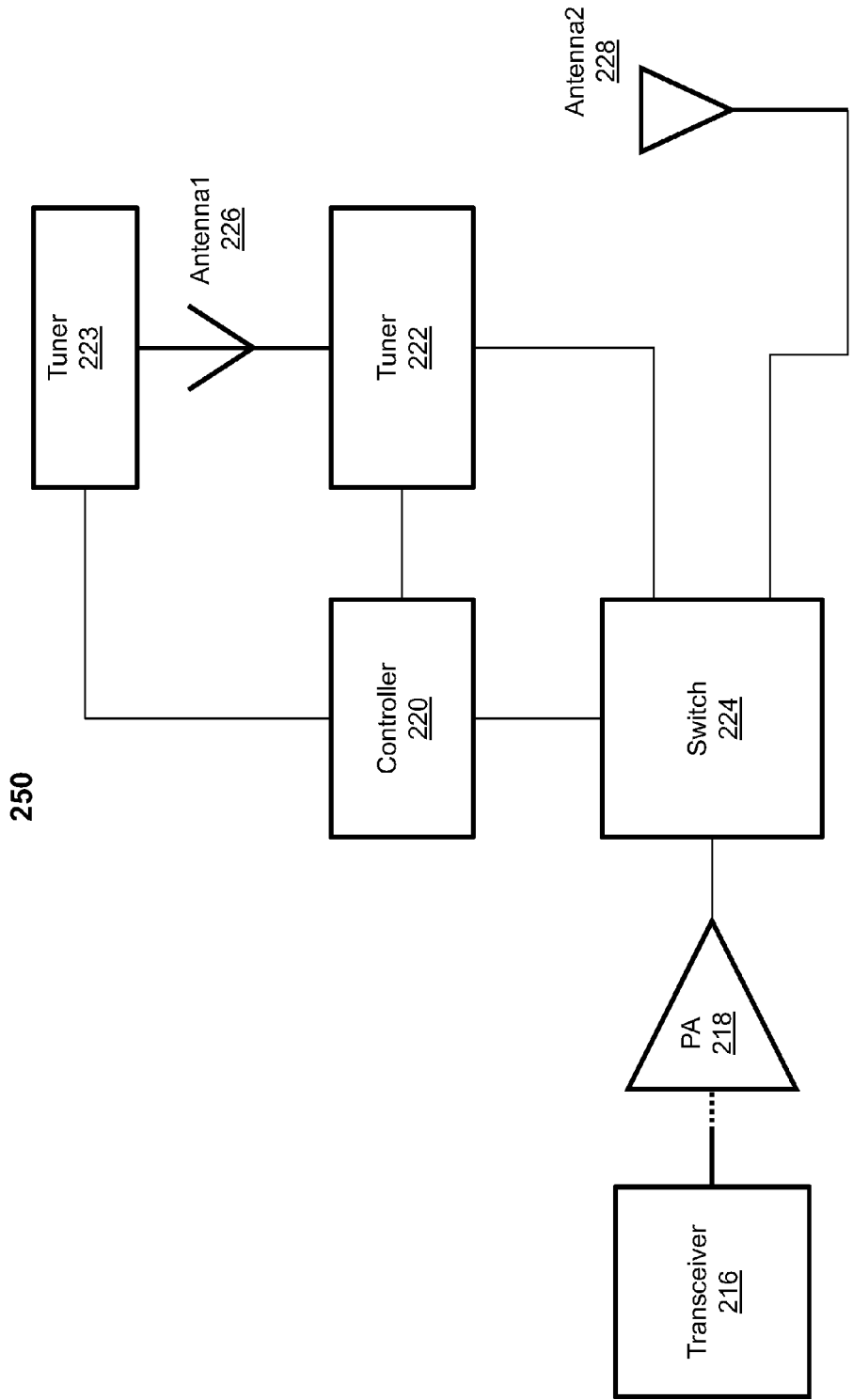
FIG. 2B illustrates another block diagram representation of radio frequency communications components (RFCC), including a controller, two antenna tuners and an antenna selection switch, in a wireless communication device (WCD), according to one embodiment.

In one embodiment, as shown in FIGS. 1A and 2A, antenna tuner 122/222 represents an impedance matching tuner, which provides antenna tuning using a matching network. FIGS. 1B and 2B provides a different implementation of RFCC 150/250, which are similarly configured to RFCC 100/200 of FIGS. 1A/2A, except that in addition to antenna tuner 122/222, an additional antenna tuner, electrical length adjusting antenna tuner 123/223, is associated with each first antenna 126/226.

In FIG. 2B, controller 220 is coupled to antenna tuner 222, and controller 220 is also coupled to electrical length adjusting antenna tuner 223. Additionally, antenna tuner 222 and electrical length adjusting antenna tuner 223 are respectively connected to first antenna 226. In particular, antenna tuner 222 provides antenna tuning by antenna impedance matching and more specifically by conjugate impedance matching. However, electrical length adjusting antenna tuner 223 operates independently of antenna tuner 222 to provide antenna tuning by which the antenna resonant frequency and/or electrical length of the radiating element of, e.g., first antenna 226, is adjusted independently of any conjugate impedance matching that is provided by antenna tuner 222. Therefore, electrical length adjusting antenna tuner 223 is able to expand a bandwidth of the radiating element by shifting or tuning the actual resonant frequency or adjusting the electrical length of the radiating element directly. Thus, a functionality of electrical length adjusting antenna tuner 223 may be generally described as tuning of the antenna electrical length.

In one embodiment, antenna tuners, e.g., impedance matching antenna tuner 122/222, can provide impedance matching to the antenna resonator structure for the desired operating frequencies. In an alternate embodiment, as illustrated by FIGS. 1B and 2B, an additional antenna tuner, e.g., electrical length adjusting antenna tuner 123/223, can directly adjust the resonator structure or the resonant frequency of the antenna. This adjustment of the resonant structure of the antenna can be accomplished if the electrical length adjusting antenna tuners 123/223 comprise one or more microelectric machine (MEM) switches. In one embodiment, MEM switches are integrated into the antenna structure and modify the lengths of the antenna resonator when the MEM switches are actuated. In one or more alternate embodiments, the adjustment of the resonate structure of the antenna by electrical length tuning of a radiating element of the antenna can be accomplished via the use of FE capacitors or variable capacitors, varactors or veractor diodes, and/or diode switches within the antenna tuners 123/223, or by other methods known in the art. The electrical length adjusting antenna tuner 123/223 may also include an expanded functionality that enables the antenna tuner 123/223 to provide (a) adjustments to the antenna resonance as well as (b) impedance matching. In one embodiment, antenna tuner 123/223 comprises components that are similar components to antenna tuner 122/222. For example, antenna tuner 123/223 may comprise varactor diodes and/or variable capacitors (Vcaps) that enable antenna tuner 123/223 to provide the functionality of electrical length tuning of a radiating element.

In the descriptions that follow, antenna tuning functionality may be described mainly from the perspective of an impedance matching antenna tuner, e.g., antenna tuner 122/222. However, it is understood that electrical length tuning as is provided by electrical length adjusting antenna tuner 123/223 can apply as well to these descriptions as well. Furthermore, in one embodiment, electrical length adjusting antenna tuner 123/223 may be integrated, such that with both impedance matching functionality and electrical length or resonant frequency tuning functionality are provided within a single tuning network.

Referring again to FIG. 2A, RFCC 200 also comprises second antenna 228 which is directly connected to a second output port of antenna selection switch 224, i.e., with no in line tuner. In operation, antenna selection switch 224 selectively or switchably connects transceiver 216 to a first or second output port of antenna selection switch 224 to propagate a signal originating from transceiver 216 to either first antenna 226 or second antenna 228.

In RFCC 200, antenna tuner 222 receives an RF signal input, measures the return loss, performs impedance matching to reduce the return loss, and provides feedback information associated with the first antenna. The feedback information reports a level of success in reducing the return loss to a threshold level of return loss, by indicating how close the current level of return loss is to a return loss goal. The antenna tuner 222 provides the feedback associated with the first antenna 226 to controller 220. The feedback indicates a current status of the antenna tuner 222, where the current status corresponds to a level of antenna impedance matching. Controller 220 uses the feedback to select one of the at least two antennas to connect the transmitter to, and controller 220 triggers the antenna selection switch 224 to connect the selected one of the at least two antennas to the switch input in order to propagate the at least one transmission signal from the transmitter of transceiver 216 to the selected one of the at least two antennas. In particular, in response to receipt of feedback information indicating that the antenna tuner 222 has a locked status, controller 220 dynamically triggers the antenna selection switch 224 to connect the first antenna 226 to the first switch output to propagate the at least one transmission signal from the transmitter to the first antenna 226.

Furthermore, controller 220 determines from feedback (see, for example, feedback 326 of FIG. 3) whether the closed feedback loop configuration, i.e., within which the antenna tuner is connected, is in a locked or unlocked state. In one embodiment, in response to receipt by controller 220 of an unlocked status of the antenna tuner 222, controller 220 selects a second antenna, e.g., second antenna 228, which is not associated with an antenna tuner, to connect transmitter 216 to, and controller 220 triggers antenna selection switch 224 to make the connection.

However, in another embodiment, in response to receipt by controller 220 of an unlocked status of first antenna 226, controller 220 determines whether current device usage characteristics, e.g., included within usage characteristics files 106, are available and/or accessible. If current device usage characteristics are not accessible, controller 220 selects an antenna that is at least one of: (a) a less loaded antenna; (b) an antenna that exhibits less than a preset threshold level of loading; and (c) an antenna that is not associated with an antenna tuner. However, if current device usage characteristics are accessible, controller 220 retrieves the current device usage characteristics. Controller 220 determines whether the current device usage characteristics match a pre-established set of device usage characteristics associated with the use of a preferred antenna.

The preferred antenna is pre-determined based on a performance of the antenna in usage conditions that are defined by the pre-established set of device usage characteristics that include at least one of: an execution of a particular application; a characteristic device positioning state(s); and a characteristic handling of the communications device. For example, a characteristic device position state may be one of: in the pocket; on a table; and in a belt holder. The characteristic device positioning state may be associated with one or more of a position of the display and orientation of the device. Thus, an antenna can be established as a preferred or default antenna and designated for use in particular device operating conditions that are defined by specific device usage characteristics. ATS logic 108 and/or controller 220 may configure the number of usage characteristics that are utilized to define particular operating conditions and/or operating modes. Furthermore, ATS logic 108 and/or controller 220 may configure the level of correlation between usage characteristics that are currently detected and pre-established usage characteristics that are required to indicate that both the current and pre-established usage characteristics define substantially the same operating conditions. As a result, if the operating conditions are the same, an antenna designated as a preferred antenna based on quality performance in pre-established operating conditions is likely to perform well in current operating conditions that match the pre-established operating conditions. However, other factors may also be considered.

Thus, if the current device usage characteristics matches the pre-established set of device usage characteristics, controller 220, giving due consideration to the current usage characteristics, selects an antenna from among the at least two antennas that is at least one of: (a) pre-established as the preferred antenna; (b) a less loaded antenna; (c) an antenna that exhibits less than a threshold level of loading; and (d) an antenna that is not associated with an antenna tuner. If the current usage characteristics conditions do not match the pre-established set of device usage characteristics, controller 220, without giving consideration to the usage characteristics, selects an antenna from among the at least two antennas that is at least one of: (a) a less loaded antenna; (b) an antenna that exhibits less than a threshold level of loading; and (c) an antenna that is not associated with an antenna tuner. Controller 220 triggers the antenna selection switch to connect the selected antenna to the transmitter.

In one embodiment, WCD 100 utilizes at least one device sensor, such as sensor 132 from FIG. 1, to detect, determine and/or compile one or more of the current usage characteristics of WCD 100, including at least one of: (a) characteristics of user handling of the communications device; (b) characteristics of device positioning; and (c) characteristics of usage of particular device functions. The device sensor(s) forwards information about the current usage characteristics of the device to the controller 220, which triggers antenna tuner 222 to make antenna tuning adjustments and generate the feedback information. This feedback information then causes controller 220 to select an antenna based on at least one of: the current usage characteristics; the current status of the antenna tuner; and other feedback information.

In one embodiment, controller 220 receives information identifying which applications 109 (FIG. 1) are actively and currently being executed on WCD 100. In one embodiment, controller 220 receives information about an execution of particular applications and/or functions from an application or task management system or module. In addition, information about the use of particular applications and/or functions may be provided by device sensors. For example, some of these sensors may include proximity sensors and touch sensors including piezoelectric sensors. In one embodiment, controller 220 determines from the received information the number and type of communications air interfaces that are active. Controller 120/220 is able to select a best antenna based on the communications air interfaces that are active. For example, controller 120/220 may select a particular antenna from among antennas having different bandwidths to support the various communications modes that are associated with the active communications air interfaces.

In one embodiment, controller 120/220 determines whether one or more of the applications and/or functions that are actively being executed on WCD 100 respectively matches a pre-identified application and/or function that is associated with pre-established usage characteristics. If one or more of the applications that are actively being executed matches a pre-identified application that is associated with pre-established usage characteristics, controller 120/220 determines whether at least one current usage characteristic associated with the one or more of the applications and functions matches at least one of the pre-established usage characteristics. Thus, controller 120/220 first determines whether the applications match, and if the applications match, controller 120/220 determines whether the current usage of the device to execute the applications is at least substantially similar to the manner in which the application was utilized when determining the pre-established usage characteristics. Thus, if at least one current usage characteristic matches at least one of the pre-established usage characteristics, controller 120/220 evaluates at least one of (a) characteristics of antenna radiation efficiency for one or more antennas in device conditions that are defined by the pre-established usage characteristics, (b) current radiation efficiency requirements, (c) current state of radiation efficiency, and (d) the current status of the antenna tuner, in order to determine which one of the at least two antennas to connect the transmitter to. In one embodiment, controller 120/220 evaluates efficiency characteristics associated with the current state of radiation efficiency, based on information provided within the feedback, e.g., feedback 326 (FIG. 3), from antenna tuner 222.

In one embodiment, controller 120/220 determines a level of power being delivered to at least the first antenna by using the current status of the antenna tuner. Controller 120/220 then compares, for at least the first antenna, the determined level of power to a power level that represents a transmitting power requirement for the transmitter. Controller 120/220 identifies a selected antenna based on determining a performance of an antenna(s) and/or comparing different antenna performances in order to enable the transmitter to get close, or closer, to transmitting, to an antenna, a signal having the power level that represents the transmitting power requirement.

In one embodiment, controller 120/220, in determining which one of the at least two antennas to connect to the transmitter, evaluates at least one of: (a) a duty cycle goal; and (b) output power associated with the current antenna status. The duty cycle goal provides (or specifies) a periodic, maximum time interval that represents an established duty cycle period by which controller 120/220 limits a connection between a first selected antenna and the transmitter. Controller 120/220 determines whether the output power is greater than a preset threshold level of output power. If the output power is greater than the preset threshold level of output power, controller 120/220 (a) triggers the antenna selection switch to connect the transmitter to the first selected antenna for a first time interval that is less than the established duty cycle period; and (b) triggers the antenna selection switch to connect the transmitter to at least one other antenna for a remaining time interval of the duty cycle period, while excluding the first selected antenna from being connected to the transmitter for the remaining time interval that follows the first time interval. However, in response to a determination that the output power is not greater than the preset threshold level of power, controller 120/220 triggers the antenna selection switch to connect the transmitter to the first selected antenna for an entire duration of the established duty cycle period.

Figure 3:
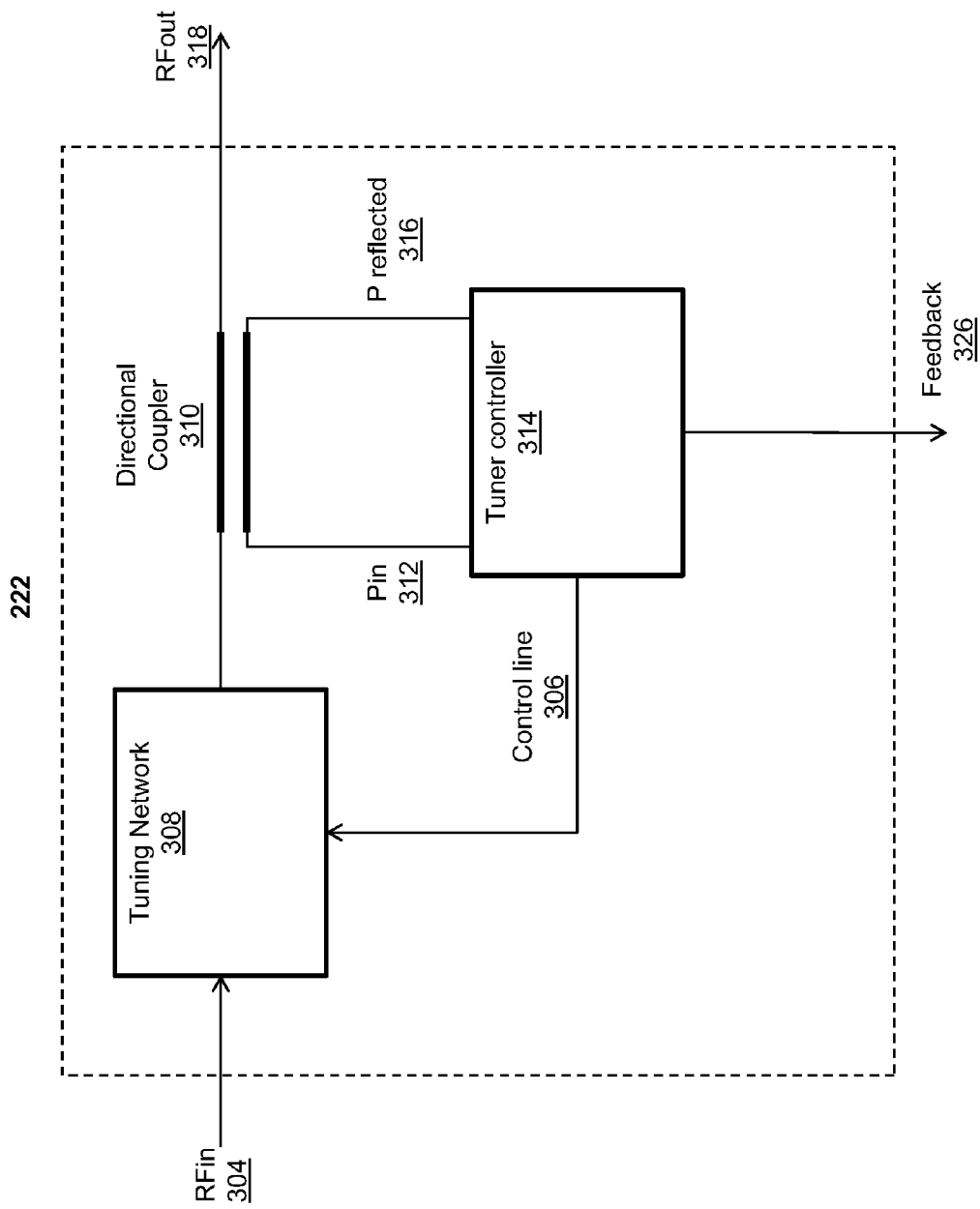
FIG. 3 illustrates a detailed view of the antenna tuner of FIG. 2, according to one embodiment, according to one embodiment.

Turning now to FIG. 3, a functional block diagram view of the antenna tuner of FIG. 2 is illustrated, according to one embodiment. Tuner 222 comprises tuning network 308. Tuning network 308 receives RFin signal 304 at an input port of tuning network 308. In one embodiment, RFin signal 304 represents a signal originally propagated by a transceiver (e.g., transceiver 216), amplified by power amplifier 218 and then propagated via antenna selection switch 224 to antenna tuner 222. However, to facilitate description of the described embodiments, RFin signal 304 may be referred to herein as a signal propagated by transceiver 216. Referring further to tuning network 308, coupled to the output of tuning network 308 is directional coupler 310. Directional coupler 310 receives an output signal from tuning network 308, enables monitoring of signal power of the output signal and provides RFout signal 318 as an output signal of antenna tuner 222.

Tuner 222 also comprises tuner controller 314 which is connected via control line(s) 306 to tuning network 308. Tuner controller 314 is connected to directional coupler 310 in order to measure P-In 312 (i.e., the signal power for the signal propagated to the antenna) and P-Reflected 316 (i.e., the signal power associated with an antenna impedance mismatch). Tuner controller 314 determines a level of return loss based on P-In 312 and P-Reflected 316. Tuner controller 314 sends one or more control signals via control lines 306 to make tuning adjustments at tuning network 308, in order to minimize the level of return loss. Tuner controller 314 provides feedback 326 to an antenna switch controller (e.g., controller 220) to report a level of success in reducing the return loss to a threshold level of return loss to indicate how close the current level of return loss is to a return loss goal. In particular, controller 220 receives an indication of the tuning network state from feedback 326. Furthermore, controller 220 determines from feedback 326 whether the closed feedback loop configuration (i.e., within which the antenna tuner is connected) is in a locked or unlocked state.

Tuner controller 314 sends a control output(s) via control line(s) 306 to trigger impedance transformation via the tuning network. In one embodiment, tuner controller 314 provides information about the state of the control lines within feedback 326 that is sent to controller 220. Information about the state of the control lines indicates how effectively and/or how efficiently the antenna radiates an output signal. Control line states may be pre-mapped to established levels of antenna radiation efficiency. For example, the levels of antenna radiation efficiency may be represented by three (3) levels which may be defined as (a) poor, (b) neutral and (c) good. Controller 220 can include antenna radiation efficiency as a factor in selecting an antenna to receive and radiate a signal that is propagated from the transmitter.

Figure 4:
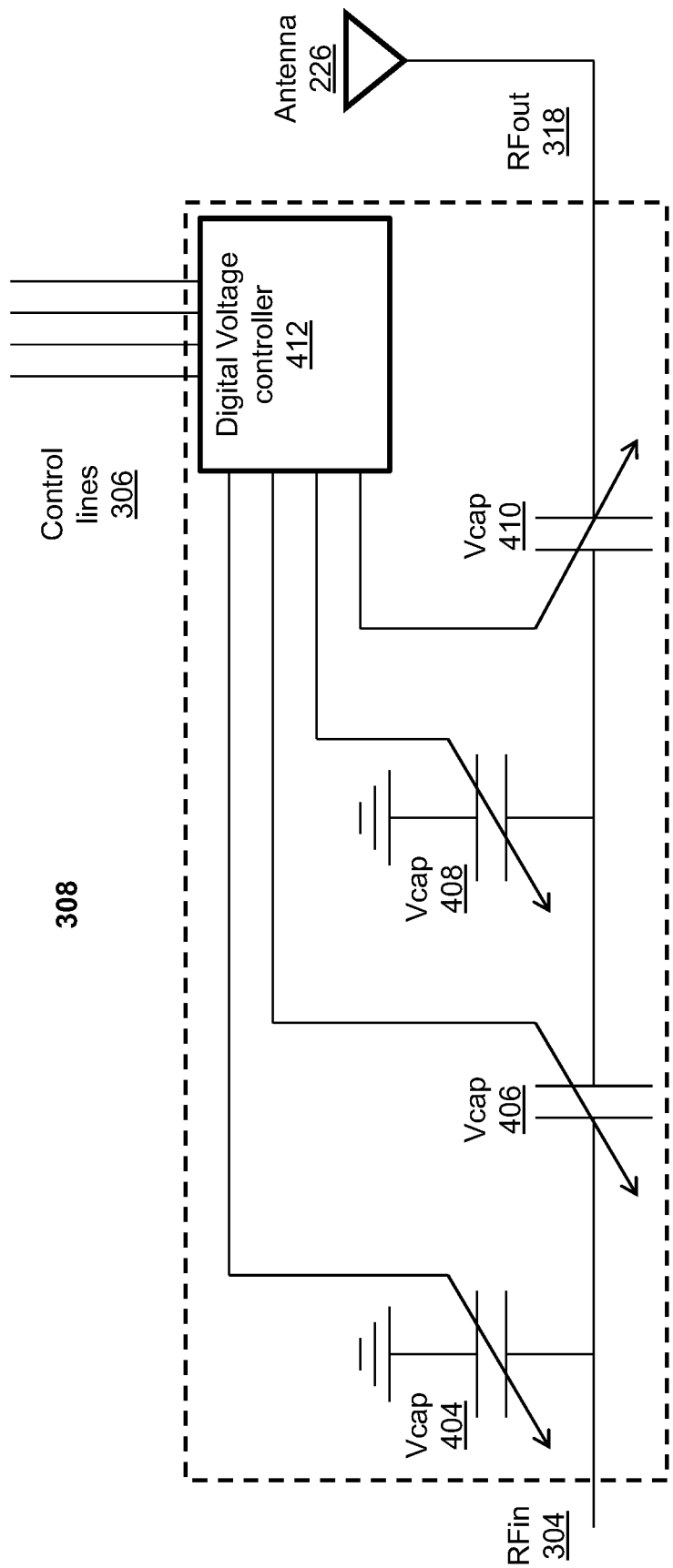
FIG. 4 illustrates a tuning network having a digital voltage controller (DVC), according to one embodiment.

Referring to FIG. 4, there is illustrated an example tuning network having a digital voltage controller (DVC) 412, according to one embodiment. Tuning network 308 comprises DVC 412, which receives control signals via control lines 306. Tuning network 308 also comprises a plurality of variable capacitors (Vcaps). In a particular embodiment, four (4) variable capacitors are implemented within tuning network 308. These variable capacitors are illustrated as first Vcap 404, second Vcap 406, third Vcap 408 and fourth Vcap 410. In addition, tuning network 308 receives RFin signal 304 as an input signal and yields RFout signal 318 as an output signal. In the described embodiments, antenna tuner 222, tuning network 308 and/or the corresponding tuning network elements are implemented as distinct and separate components to antenna 226. However, in another embodiment, antenna tuner 222, tuning network 308 and/or the corresponding tuning network elements are implemented as part of antenna 226.

In the illustrative example of tuning network 308, DVC 412 sends voltage control signals to the Vcaps to adjust the corresponding capacitances to provide a desired antenna impedance matching. In one embodiment, the Vcaps are implemented by using micro-electromechanical (MEMs) varactors or other voltage variable capacitance structures.

Also, within tuning network 308, RFout signal 318 provides an indication of the level of impedance matching that is achieved from adjusting the capacitances in tuning network 308. As described in FIG. 3, tuner controller 314 monitors return loss by using a directional coupler (e.g., directional coupler 310) to receive RFout signal 318 or a signal substantially equivalent to RFout signal 318. Antenna tuner 222 reports the ability to achieve a return loss goal as feedback to controller 120/220 to enable controller 120/220 to selectively trigger an antenna connection to the transmitter, following antenna impedance matching.

Figure 5:
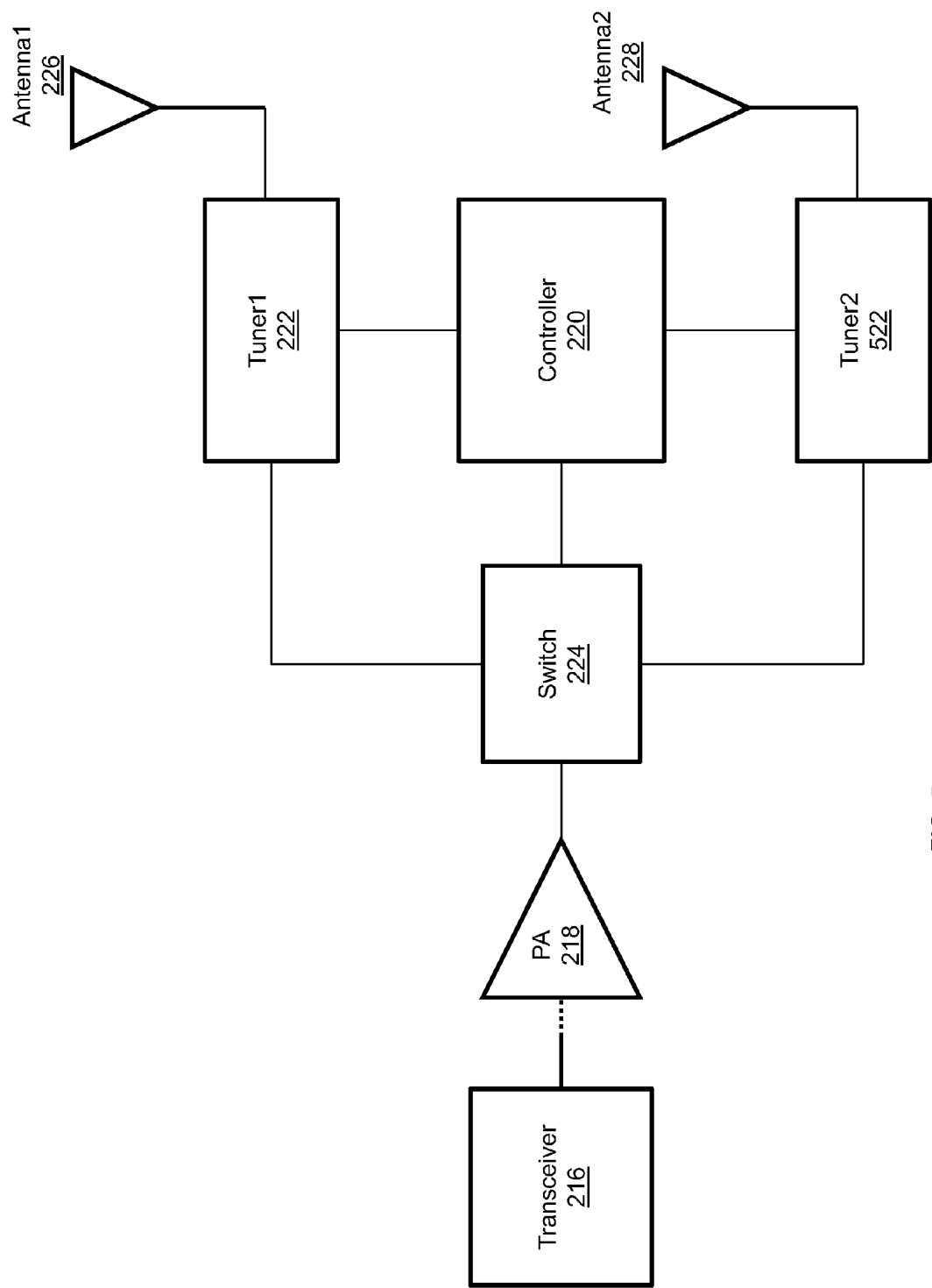
FIG. 5 illustrates another block diagram representation of radio frequency communications components (RFCC), including two antenna tuners for corresponding antennas, in a wireless communications device (WCD), according to one embodiment.

FIG. 5 illustrates another block diagram representation of radio frequency communications components (RFCC), including two antenna tuners for corresponding antennas, in a wireless communications device (WCD), according to one embodiment. RFCC 500 includes a transceiver 216 coupled to a power amplifier (PA) 218 which is further coupled to antenna selection switch 224. Antenna selection switch 224 is further coupled to controller 220, which is in turn coupled to first antenna tuner 222 and a second antenna tuner 522. First antenna tuner 222 and second antenna tuner 522 are respectively connected to antenna selection switch 224. Additionally, first antenna tuner 222 is connected to first antenna 226, and second antenna tuner 522 is connected to second antenna 228. Thus, similar to the antenna selection functionality in the configuration of FIG. 2, antenna selection switch 224 selectively and/or or switchably connects transceiver 216 to a first output port or second output port of antenna selection switch 224 to propagate a signal originating from transceiver 216 to either first antenna 226 or second antenna 228.

In one embodiment, RFCC 500 can be similarly configured as in FIG. 1B and FIG. 2B, with an additional electrical length adjusting antenna tuner coupled to each antenna, in addition to the impedance matching tuners, first antenna tuner 222 and second antenna tuner 522. With this configuration, an electrical length adjusting antenna tuner is also associated with each antenna that has an impedance matching tuner coupled to the antenna.

First antenna tuner 222 provides a first current status that is associated with first antenna 226. Similarly, second antenna tuner 522 provides a second current status that is associated with second antenna 228. Controller 220 compares the (first) current antenna status of the first antenna to the (second) current antenna status of the second antenna to determine which one of the first antenna and the second antenna to connect the transmitter to. In response to both the first antenna tuner and the second antenna tuner having a locked status, controller 220 selects one of the first antenna and the second antenna that is one or more of (a) a less loaded antenna and (b) a preferred antenna, and controller 220 triggers the antenna selection switch to connect the switch input to the selected antenna.

Figure 6:
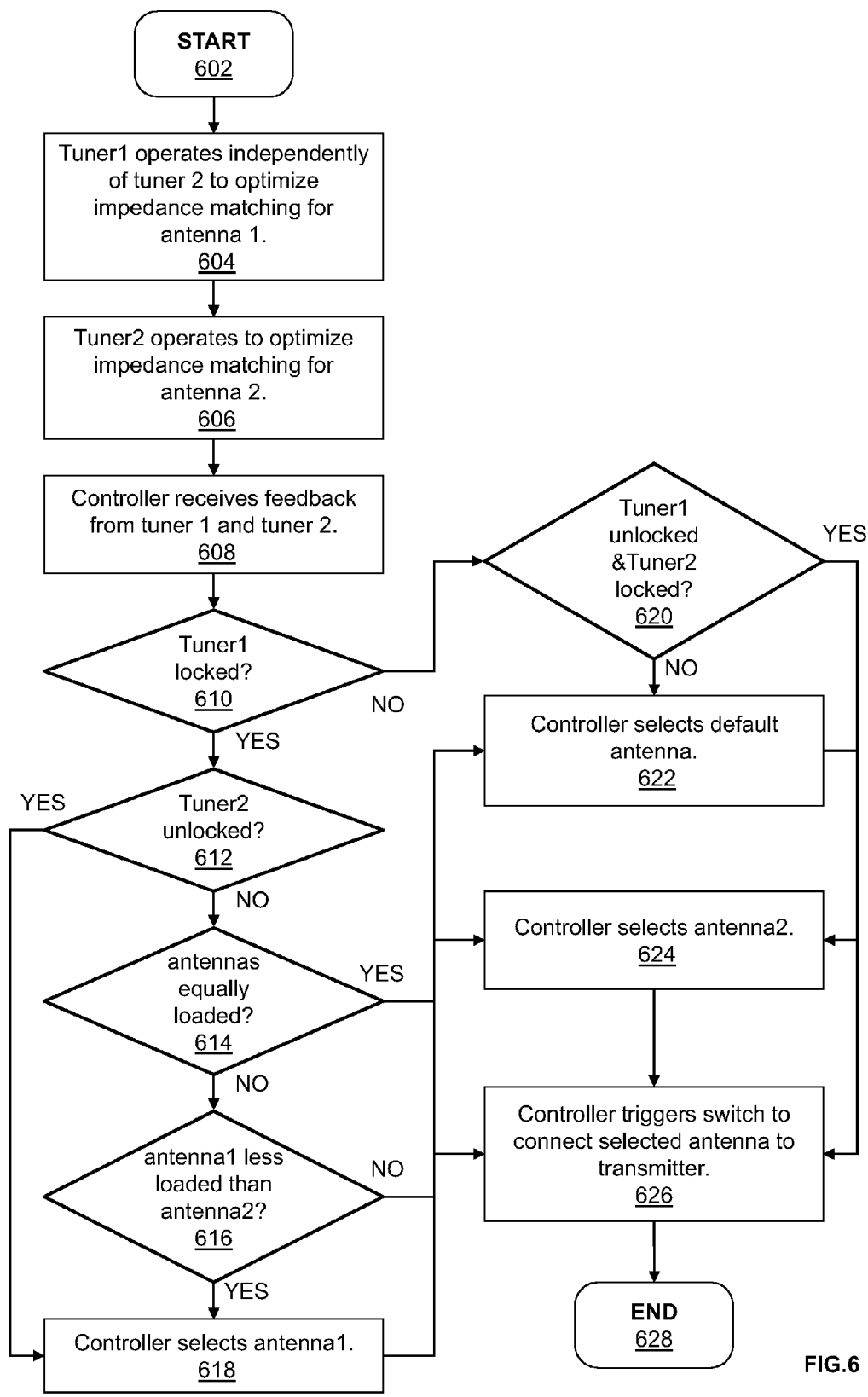
FIG. 6 is a flow chart illustrating a method for selecting an antenna to which to connect a transmitter based on transformed impedances associated with two antennas, according to one embodiment.
Figure 7:
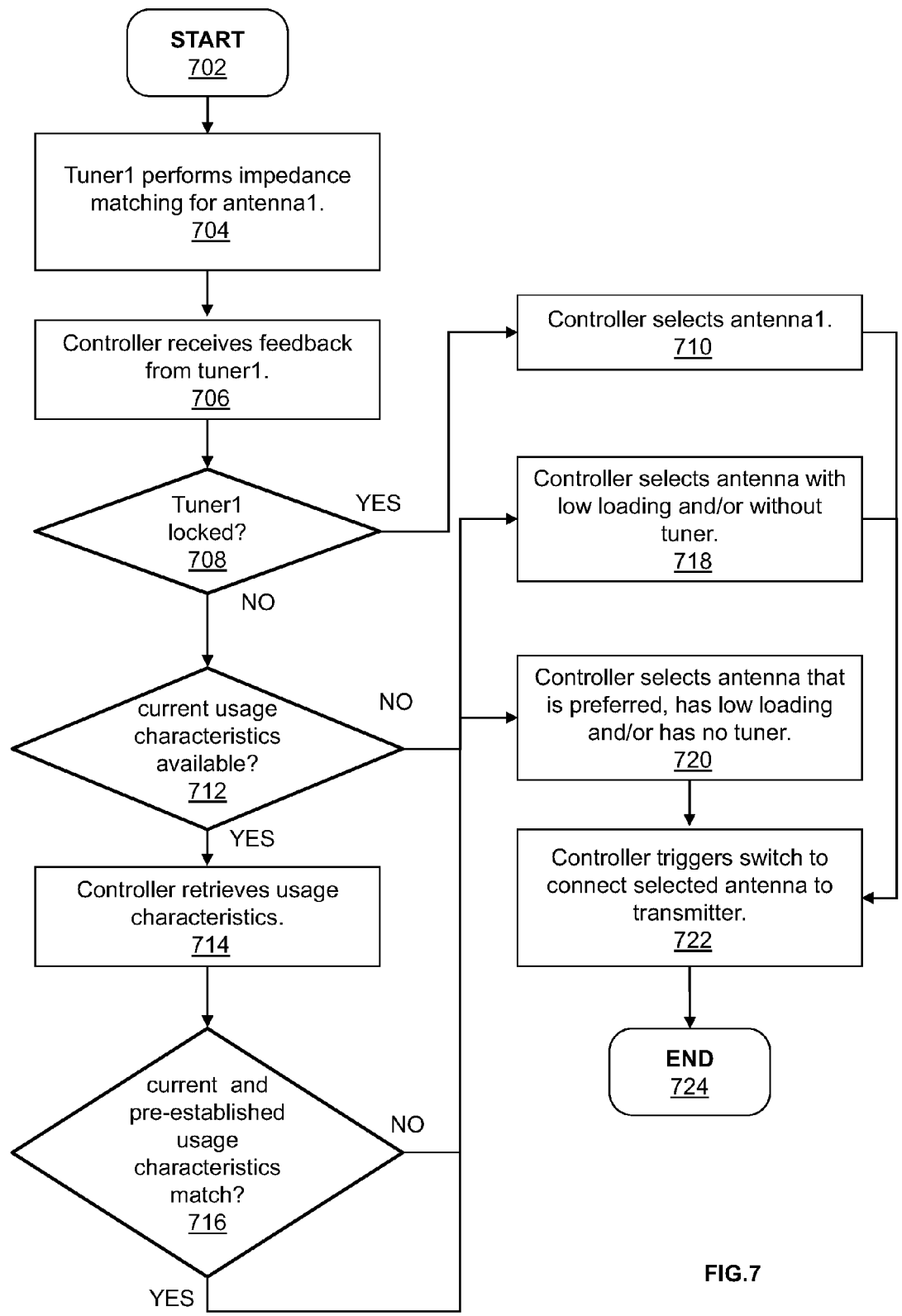
FIG. 7 is a flow chart illustrating a method for selecting an antenna to which to connect a transmitter based on (a) a transformed impedance associated with one of at least two antennas and/or (b) matching usage characteristics, according to one embodiment.
Figure 8:
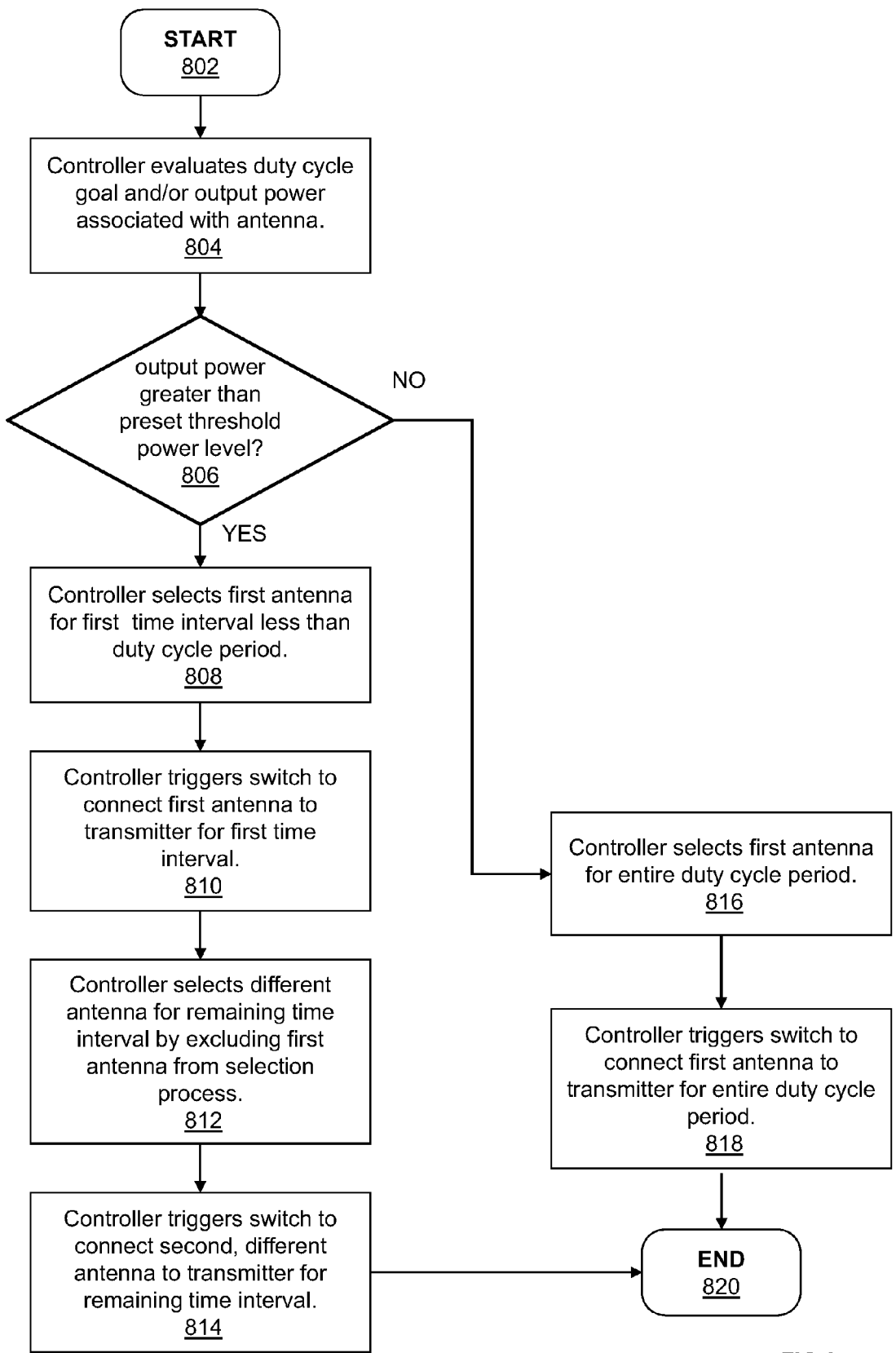
FIG. 8 is a flow chart illustrating a method for selecting an antenna to connect a transmitter to, based on duty cycle goal and output power associated with at least one antenna, according to one embodiment.

FIGS. 6-8 are flow charts illustrating the methods by which the above processes of the illustrative embodiments can be implemented. Although the method illustrated in FIGS. 6-8 may be described with reference to components and functionality illustrated by and described in reference to FIGS. 1-5, it should be understood that this is merely for convenience and alternative components and/or configurations thereof can be employed when implementing the various methods. Certain portions of the methods may be completed by ATS utility 108 executing on one or more processors (processor 110 or DSP 114) within WCD 100 (FIG. 1), RFCC 200/500 (FIG. 2 or 5), or by controller 120/220. The executed processes then control specific operations of or on WCD 100. For simplicity is describing the methods, all method processes are described from the perspective of controller 120/220.

FIG. 6 illustrates the method for selecting an antenna to which to connect a transmitter, based on transformed impedances associated with two antennas, both having in line antenna tuners, according to one embodiment. The method begins at initiator block 602 and proceeds to block 604 at which first antenna tuner 222 operates independently of second antenna tuner 522 to optimize impedance matching for first antenna 226. At block 606, second antenna tuner 522 operates independently of first antenna tuner 222 to optimize impedance matching for second antenna 228. At block 608, controller receives feedback from both first antenna tuner 222 and second antenna tuner 522. At decision block 610, controller 120/220, via ATS logic 108 executing within controller 120/220, determines, using the feedback, whether first antenna tuner 222 is locked, i.e., the current status of first antenna tuner 222 is locked. If at decision block 610 controller 120/220 determines that the first antenna tuner 222 is locked, the process moves to decision block 612, at which, controller 120/220 determines, using the feedback, whether second antenna tuner 522 is unlocked.

If, at decision block 612, controller 120/220 determines that second antenna tuner 522 is unlocked, while first antenna tuner 222 is locked, the process moves to block 618, at which, controller 120/220 selects first antenna 226 to connect the transmitter to. However, if at decision block 612 controller 120/220 determines that second antenna tuner 522 is locked, while first antenna tuner 222 is also locked, the process moves to decision block 614, at which, controller 120/220 determines, using the feedback, whether first antenna 226 and second antenna 228 are equally loaded. If, at decision block 614, controller 120/220 determines that first antenna 226 and second antenna 228 are equally loaded, the process moves to block 622, at which, controller 120/220 selects a pre-established default antenna to which to connect transmitter 216. The default antenna is pre-established as a preferred antenna when both antennas are equally loaded and in a locked status. However, if, at decision block 614, controller 120/220 determines that first antenna 226 and second antenna 228 are not equally loaded, the process moves to decision block 616, at which, controller 120/220 determines whether first antenna 226 is less loaded than second antenna 228. If, at decision block 616, controller 120/220 determines that first antenna 226 is less loaded than second antenna 228, the process moves to block 618, at which, controller 120/220 selects first antenna 226 to connect transmitter 216 to. However, if, at decision block 616, controller 120/220 determines that second antenna 228 is less loaded than first antenna 226, the process moves to block 624, at which, controller 120/220 selects second antenna 228 to connect the transmitter to. By deduction, if first antenna 226 and second antenna 228 are not equally loaded, and first antenna 226 is not less loaded than second antenna 228, second antenna is determined to be less loaded than first antenna 226.

Referring again to decision block 610, if controller 120/220 determines that the first antenna tuner 222 is unlocked, the process moves to decision block 620, at which, controller 120/220 determines, using the feedback, whether second antenna tuner 522 is locked, while first antenna tuner 222 is unlocked. If controller 120/220 determines, at decision block 620, that second antenna tuner 522 is locked, while first antenna tuner 222 is unlocked, the process moves to block 624, at which, controller 120/220 selects second antenna 228 to connect transmitter 216 to. However, if, at decision block 620, controller 120/220 determines that second antenna tuner 522 is unlocked, while first antenna tuner 222 is also unlocked, the process moves to block 622, at which, controller 120/220 selects a pre-established default antenna to connect transmitter 216 to under such conditions. At block 626, controller 120/220 triggers the antenna selection switch to connect a selected antenna to transmitter 216. The process ends at block 628.

FIG. 7 illustrates the method for selecting an antenna to which to connect a transmitter based on (a) a transformed impedance associated with one of at least two antennas and/or (b) matching usage characteristics, according to one embodiment. Specifically, the present method describes the selection process when only a first one of multiple antennas has an associated in line antenna tuner. The method begins at initiator block 702 and proceeds to block 704 at which first antenna tuner 222 performs impedance matching for first antenna 226. At block 706, controller 120/220 receives feedback from first antenna tuner 222. At decision block 708, controller 120/220 determines, using the feedback, whether first antenna tuner 222 is locked. i.e., whether the current status of first antenna tuner 222 is locked. If at decision block 708 controller 120/220 determines that the first antenna tuner 222 is locked, the process moves to block 710, at which, controller 120/220 selects first antenna 226 as the antenna to connect transmitter 216 to. However, if at decision block 708 controller 120/220 determines that the first antenna tuner 222 is unlocked, the process moves to decision block 712, at which, controller 120/220 determines whether current (device) usage characteristics (and pre-established usage characteristics) are available and accessible. If at decision block 712 controller 120/220 determines that the usage characteristics are available, controller 120/220 obtains the current usage characteristics and retrieves the pre-established usage characteristics, as shown at block 714. Controller 120/220 determines whether the current and pre-established usage characteristics match or correlate, as shown at decision block 716. In one embodiment, the usage characteristics only need to attain a threshold level of correlation, rather than be a complete match. Returning to decision block 712, if controller 120/220 determines that the usage characteristics are not available, controller 120/220 selects an antenna that is at least one of (a) a less loaded antenna, (b) an antenna that exhibits less than a threshold level of loading, and (c) an antenna that is not associated with an antenna tuner, as shown at block 718. Similarly, at to decision block 716, if controller 120/220 determines that the current usage characteristics and the pre-established usage characteristics do not match, the process moves to the previously referenced block 718. However, if controller 120/220 determines that the current usage characteristics and the pre-established usage characteristics match, controller 120/220, utilizing the usage characteristics and corresponding pre-established antenna selection preferences, selects an antenna that is at least one of (a) pre-established as the preferred antenna, (b) a less loaded antenna, (c) an antenna that exhibits less than a threshold level of loading, and (d) an antenna that is not associated with an antenna tuner, as shown at block 720. Controller 120/220 triggers the antenna selection switch to connect a selected antenna to transmitter 216, as shown at block 722. The process ends at block 724.

FIG. 8 illustrates the method for selecting an antenna to which to connect a transmitter, based on duty cycle goal and output power associated with at least one antenna, according to one embodiment. The method begins at initiator block 802 and proceeds to block 804 at which controller 120/220 evaluates duty cycle goal and/or output power associated with an antenna. The duty cycle goal provides a periodic, maximum time duration that represents an established duty cycle period by which the controller limits a connection between an antenna and the transmitter. At decision block 806, controller 120/220 determines whether the output power is greater than a preset threshold level of power. The threshold may be a different value for different frequencies of transmission. If, at decision block 806, controller 120/220 determines that the output power is greater than the preset threshold level of power, controller 120/220 selects an antenna for a first time interval of the duty cycle period, as shown at block 808. Controller 120/220 triggers the antenna selection switch to connect the transmitter to the first selected antenna for the first time interval that is less than an established duty cycle period, as shown at block 810. At block 812, controller 120/220 selects at least one different antenna for a remaining time interval of the duty cycle period, while excluding the first selected antenna from being connected to the transmitter for the remaining time interval that follows the first time interval. At block 814, controller 120/220 triggers the antenna selection switch to connect the transmitter to the other, different antenna for a remaining time interval of the duty cycle period. Referring again to decision block 806, if controller 120/220 determines that the output power is not greater than the preset threshold level of power, controller 120/220 selects a single antenna for an entire duration of the established duty cycle period, as shown at block 816. At block 818, controller 120/220 triggers the antenna selection switch to connect the transmitter to the first selected antenna for a complete duration of the established duty cycle period. The process ends at block 820.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

In some implementations, certain processes of the methods are combined, performed simultaneously or in a different order, or perhaps omitted, without deviating from the spirit and scope of the invention. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A communications device comprising:
   at least two antennas;
   at least one transmitter;
   an antenna selection switch having a switch input, wherein the antenna selection switch is coupled to the at least two antennas wherein the antenna selection switch: receives at least one transmission signal from a first transmitter of the at least one transmitter at the switch input; and switchably couples the switch input to a select one of the at least two antennas to propagate the at least one transmission signal to the select one of the at least two antennas;
   an antenna tuner coupled to a first antenna of the at least two antennas wherein the antenna tuner being connected in a closed loop feedback configuration that provides feedback information wherein the feedback information indicates a current status of the antenna tuner and indicates if the closed feedback loop is in a locked or unlocked state; and
   a controller coupled to the antenna selection switch and to the antenna tuner, and which receives the feedback information, and in response to receipt of feedback information indicating that the antenna tuner has a locked status, dynamically triggers the antenna selection switch to connect the first antenna to the switch input to propagate the at least one transmission signal from the first transmitter to the first antenna and in response to receipt by the controller of an unlocked status of the antenna tuner, the controller:
   determines whether current device usage characteristics are accessible;
   in response to a determination that current device usage characteristics are not accessible, selects an antenna from among the at least two antennas that is at least one of:
   (a) a less loaded antenna; (b) an antenna that exhibits less than a threshold level of loading; and (c) an antenna that is not associated with an antenna tuner;

in response to a determination that current device usage characteristics are accessible:
  retrieves current device usage characteristics;
  determines whether current device usage characteristics match a pre-established set of device usage characteristics associated with use of a preferred antenna;
    wherein the preferred antenna is established based on a performance of an antenna in usage conditions that are defined by the pre-established set of device usage characteristics that include at least one of: (a) an execution of a particular application; (b) a characteristic device positioning state; and (c) a characteristic handling of the device;
  in response to a determination that current device usage characteristics match the pre-established set of device usage characteristics, selects an antenna from among the at least two antennas that is at least one of: (a) pre-established as the preferred antenna; (b) a less loaded antenna; (c) an antenna that exhibits less than a threshold level of loading; and (d) an antenna that is not associated with an antenna tuner; and
in response to a determination that current device usage characteristics do not match the pre-established set of device usage characteristics, selects an antenna from among the at least two antennas that is at least one of: (a) a less loaded antenna; (b) an antenna that exhibits less than a threshold level of loading; and (c) an antenna that is not associated with an antenna tuner; and
triggers the antenna selection switch to connect the selected antenna to the first transmitter.

2. The communications device of claim 1, further comprising at least one device sensor that:
  detects a current usage characteristics of the communications device including at least one of: (a) characteristics of user handling of the communications device; (b) characteristics of device positioning; and (c) characteristics of usage of particular device functions; and
  forwards the current usage characteristics to the controller to cause the controller to select an antenna based on at least one of: the current usage characteristics; the current status of the antenna tuner; and other feedback information.

3. The communications device of claim 1, wherein the controller:
  receives information about current usage characteristics related to applications and functions that are actively being executed on the communications device;
  determines whether at least one current usage characteristic matches at least one of the pre-established usage characteristics; and
  in response to the at least one current usage characteristic matching at least one of the pre-established usage characteristics, evaluates at least one of (a) characteristics of antenna radiation efficiency for one or more antennas in device conditions that are defined by the pre-established usage characteristics, (b) current radiation efficiency requirements, (c) current state of radiation efficiency and (d) current status of the antenna tuner, in order to determine which one of the two or more antennas to connect the first transmitter to.

4. The communications device of claim 1, wherein:
the at least two antennas comprise a second antenna with an associated antenna tuner that indicates a status associated with the second antenna; and
the controller compares the current antenna status of the first antenna to the current antenna status of the second antenna to determine which one of the first antenna and the second antenna to connect the first transmitter to; and
in response to both the first antenna tuner and the second antenna tuner having a locked status, the controller selects one of the first antenna and the second antenna that is one or more of a less loaded antenna and a preferred antenna, and triggers the antenna selection switch to connect the switch input to the selected antenna.

5. The communications device of claim 1, wherein the controller:
  determines a level of power being delivered to at least the first antenna;
  compares, for at least the first antenna, the determined level of power to a power level that represents a transmitting power requirement for the first transmitter; and
  identifies a selected antenna based on at least one of: the level of power being delivered to at least the first antenna; and whether a signal delivered to the antenna has at least the power level that represents the transmitting power requirement.

6. The communications device of claim 1, wherein the controller:
  evaluates, in order to determine which one of the at least two antennas to connect to the first transmitter, at least one of: (a) a duty cycle goal; and (b) output power associated with the current antenna status;
    wherein the duty cycle goal provides a periodic, maximum time duration that represents an established duty cycle period by which the controller limits a connection between a first selected antenna and the first transmitter;
  determines whether the output power is greater than a preset threshold level of power;
  in response to the output power being greater than a preset threshold level of power: triggers the antenna selection switch to connect the first transmitter to the first selected antenna for a first time interval that is less than an established duty cycle period;
  triggers the antenna selection switch to connect the first transmitter to at least one other antenna for a remaining time interval of the duty cycle period, while excluding the first selected antenna from being connected to the first transmitter for the remaining time interval that follows the first time interval; and
  in response to a determination that the output power is not greater than the preset threshold level of power: triggers the antenna selection switch to connect the first transmitter to the first selected antenna for a duration of the established duty cycle period.

7. An antenna switching integrated circuit comprising:
at least one transmitter;
an antenna selection switch having a switch input, wherein the antenna selection switch is coupled to at least two antennas and which: receives at least one transmission signal from a first transmitter of the at least one transmitter at the switch input; and
switchably couples the switch input to a select one of the at least two antennas to propagate the at least one transmission signal to the select one of the at least two antennas;
an antenna tuner coupled to a first antenna of the at least two antennas wherein the antenna tuner being connected in a closed loop feedback configuration that provides feedback information wherein the feedback information indicates a current status of the antenna tuner and wherein the feedback information indicates if the closed feedback loop is in a locked or unlocked state, and in response to receipt by the controller of an unlocked status of the antenna tuner, the controller; and a controller coupled to the antenna selection switch and to the antenna tuner, and which receives the feedback information, and in response to receipt of feedback information indicating that the antenna tuner has a locked status, dynamically triggers the antenna selection switch to connect the first antenna to the switch input to propagate the at least one transmission signal from the first transmitter to the first antenna and in response to receipt by the controller of an unlocked status of the antenna tuner, the controller:

determines whether current device usage characteristics are accessible;

in response to a determination that current device usage characteristics are not accessible, selects an antenna from among the at least two antennas that is at least one of:

(a) a less loaded antenna; (b) an antenna that exhibits less than a threshold level of loading; and (c) an antenna that is not associated with an antenna tuner;

in response to a determination that current device usage characteristics are accessible:

retrieves current device usage characteristics;

determines whether current device usage characteristics match a pre-established set of device usage characteristics associated with use of a preferred antenna;

wherein the preferred antenna is established based on a performance of an antenna in usage conditions that are defined by the pre-established set of device usage characteristics that include at least one of: (a) an execution of a particular application; (b) a characteristic device positioning state; and (c) a characteristic handling of the device;

in response to a determination that current device usage characteristics match the pre-established set of device usage characteristics, selects an antenna from among the at least two antennas that is at least one of: (a) pre-established as the preferred antenna; (b) a less loaded antenna; (c) an antenna that exhibits less than a threshold level of loading; and (d) an antenna that is not associated with an antenna tuner; and in response to a determination that current device usage characteristics do not match the pre-established set of device usage characteristics, selects an antenna from among the at least two antennas that is at least one of: (a) a less loaded antenna; (b) an antenna that exhibits less than a threshold level of loading; and (c) an antenna that is not associated with an antenna tuner; and triggers the antenna selection switch to connect the selected antenna to the first transmitter.

8. The antenna switching integrated circuit of claim 7, further comprising at least one device sensor that:

detects a current usage characteristics of the communications device including at least one of: (a) characteristics of user handling of the communications device; (b) characteristics of device positioning; and (c) characteristics of usage of particular device functions; and forwards the current usage characteristics to the controller to cause the controller to select an antenna based on at least one of: the current usage characteristics; the current status of the antenna tuner; and other feedback information.

9. The antenna switching integrated circuit of claim 7, wherein the controller:

receives information about current usage characteristics related to applications and functions that are actively being executed on the communications device;

determines whether at least one current usage characteristic matches at least one of the pre-established usage characteristics; and in response to the at least one current usage characteristic matching at least one of the pre-established usage characteristics, evaluates at least one of (a) characteristics of antenna radiation efficiency for one or more antennas in device conditions that are defined by the pre-established usage characteristics, (b) current radiation efficiency requirements, (c) current state of radiation efficiency and (d) current status of the antenna tuner, in order to determine which one of the two or more antennas to connect the first transmitter to.

10. The antenna switching integrated circuit of claim 7, wherein:

the at least two antennas comprise a second antenna with an associated antenna tuner that indicates a status associated with the second antenna; and the controller compares the current antenna status of the first antenna to the current antenna status of the second antenna to determine which one of the first antenna and the second antenna to connect the first transmitter to; and in response to both the first antenna tuner and the second antenna tuner having a locked status, the controller selects one of the first antenna and the second antenna that is one or more of a less loaded antenna and a preferred antenna, and triggers the antenna selection switch to connect the switch input to the selected antenna.

11. The antenna switching integrated circuit of claim 7, wherein the controller:

determines a level of power being delivered to at least the first antenna;

compares, for at least the first antenna, the determined level of power to a power level that represents a transmitting power requirement for the first transmitter; and identifies a selected antenna based on at least one of: the level of power being delivered to at least the first antenna; and whether a signal delivered to the antenna has at least the power level that represents the transmitting power requirement.

12. The antenna switching integrated circuit of claim 7, wherein the controller:

evaluates, in order to determine which one of the at least two antennas to connect to the first transmitter, at least one of: (a) a duty cycle goal; and (b) output power associated with the current antenna status;

wherein the duty cycle goal provides a periodic, maximum time duration that represents an established duty cycle period by which the controller limits a connection between a first selected antenna and the first transmitter;

determines whether the output power is greater than a preset threshold level of power;

in response to the output power being greater than a preset threshold level of power: triggers the antenna selection switch to connect the first transmitter to the first selected antenna for a first time interval that is less than an established duty cycle period;

triggers the antenna selection switch to connect the first transmitter to at least one other antenna for a remaining time interval of the duty cycle period, while excluding the first selected antenna from being connected to the first transmitter for the remaining time interval that follows the first time interval; and in response to a determination that the output power is not greater than the preset threshold level of power: triggers the antenna selection switch to connect the first transmitter to the first selected antenna for a duration of the established duty cycle period.

13. In an antenna switching integrated circuit, a method comprising:
receiving feedback information that includes a current status of an antenna tuner that is coupled to a first antenna from among at least two antennas;
wherein the current status is one of a locked status and an unlocked status;
in response to receipt of a locked status, selecting a first antenna to connect to a first transmitter from among at least one transmitter;
in response to receipt by the controller of an unlocked status of the antenna tuner:
determining whether current device usage characteristics are accessible;
in response to a determination that current device usage characteristics are not accessible, selecting an antenna from among the at least two antennas that is at least one of: (a) a less loaded antenna; (b) an antenna that exhibits less than a threshold level of loading; and (c) an antenna that is not associated with an antenna tuner;
in response to a determination that current device usage characteristics are accessible:
retrieving current device usage characteristics;
determining whether current device usage characteristics match a pre-established set of device usage characteristics associated with use of a preferred antenna;
wherein the preferred antenna is established based on a performance of an antenna in usage conditions that are defined by the pre-established set of device usage characteristics that include at least one of: (a) an execution of a particular application; (b) a characteristic device positioning state; and (c) a characteristic handling of the device;
in response to a determination that current device usage characteristics match the pre-established set of device usage characteristics, selecting an antenna from among the at least two antennas that is at least one of: (a) pre-established as the preferred antenna; (b) a less loaded antenna; (c) an antenna that exhibits less than a threshold level of loading; and (d) an antenna that is not associated with an antenna tuner; and
in response to a determination that current device usage characteristics do not match the pre-established set of device usage characteristics, selecting an antenna from among the at least two antennas that is at least one of: (a) a less loaded antenna; (b) an antenna that exhibits less than a threshold level of loading; and (c) an antenna that is not associated with an antenna tuner; and
triggering an antenna selection switch to connect a switch input to the first antenna in order to propagate at least one transmission signals from the first transmitter to the first antenna.

14. The method of claim 13, further comprising:
detecting a current usage characteristics of the communications device including at least one of: (a) characteristics of user handling of the communications device; (b) characteristics of device positioning; and (c) characteristics of usage of particular device functions;
forwarding the current usage characteristics to the controller; and
selecting an antenna based on at least one of: the current usage characteristics; the current status of the antenna tuner; and other feedback information.

15. The method of claim 13, wherein:
the at least two antennas comprise a second antenna with an associated antenna tuner that indicates a status associated with the second antenna; and
the controller compares the current antenna status of the first antenna to the current antenna status of the second antenna to determine which one of the first antenna and the second antenna to connect the first transmitter to; and
in response to both the first antenna tuner and the second antenna tuner having a locked status, the controller selects one of the first antenna and the second antenna that is one or more of a less loaded antenna and a preferred antenna, and triggers the antenna selection switch to connect the switch input to the selected antenna.

16. The method of claim 13, further comprising:
determines a level of power being delivered to at least the first antenna;
compares, for at least the first antenna, the determined level of power to a power level that represents a transmitting power requirement for the first transmitter; and
identifies a selected antenna based on at least one of: the level of power being delivered to at least the first antenna; and whether a signal delivered to the antenna has at least the power level that represents the transmitting power requirement.

17. The method of claim 13, further comprising:
evaluating, in order to determine which one of the at least two antennas to connect to the first transmitter, at least one of: (a) a duty cycle goal; and (b) output power associated with the current antenna status;
wherein the duty cycle goal provides a periodic, maximum time duration that represents an established duty cycle period by which the controller limits a connection between a first selected antenna and the first transmitter;
determining whether the output power is greater than a preset threshold level of power;
in response to the output power being greater than a preset threshold level of power: triggering the antenna selection switch to connect the first transmitter to the first selected antenna for a first time interval that is less than an established duty cycle period;
triggering the antenna selection switch to connect the first transmitter to at least one other antenna for a remaining time interval of the duty cycle period, while excluding the first selected antenna from being connected to the first transmitter for the remaining time interval that follows the first time interval; and
in response to a determination that the output power is not greater than the preset threshold level of power: triggering the antenna selection switch to connect the first transmitter to the first selected antenna for a duration of the established duty cycle period.

* * * * *